US006268921B1

(12) United States Patent
Seitz et al.

(10) Patent No.: US 6,268,921 B1
(45) Date of Patent: Jul. 31, 2001

(54) INTERFEROMETRIC DEVICE FOR RECORDING THE DEPTH OPTICAL REFLECTION AND/OR TRANSMISSION CHARACTERISTICS OF AN OBJECT

(75) Inventors: Peter Seitz, Urdorf; Stéphane Bourquin, Zurich; René-Paul Salathe, Ecublens, all of (CH)

(73) Assignee: CSEM Centre Suisse d'Electronique et de Microtechnique SA, Neuchatel (CH)

( * ) Notice: Subject to any disclaimer, the term of this patent is extended or adjusted under 35 U.S.C. 154(b) by 0 days.

(21) Appl. No.: 09/394,543

(22) Filed: Sep. 10, 1999

(30) Foreign Application Priority Data

Sep. 10, 1998 (FR) .................................. 98 11311

(51) Int. Cl.[7] ....................................... G01B 9/02
(52) U.S. Cl. .............................................. 356/407
(58) Field of Search .................... 356/479, 497; 351/205; 606/4, 10

(56) References Cited

U.S. PATENT DOCUMENTS

| 4,309,109 | 1/1982 | Blodgett et al. . |
| 5,151,585 | 9/1992 | Siebert . |
| 5,239,364 | 8/1993 | Matsuzaki . |
| 5,892,583 | * 4/1999 | Li ........................................ 356/497 |

FOREIGN PATENT DOCUMENTS

| 10267830A | * 9/1998 | (JP) . |
| 9418523 | 8/1994 | (WO) . |
| 9524621 | 9/1995 | (WO) . |

OTHER PUBLICATIONS

"Optical Reflectometry With Micrometer Resolution for the Investigation of Integrated Optical Devices," Paul Beaud, et al., *IEEE Journal of Quantum Electronics*, vol. 25, No. 4, Apr. 1989.

"In vivo retinal imaging by optical coherence tomography", Optics Letters, vol. 18, No. 21 (Nov. 1, 1993), pp. 864–1866.

* cited by examiner

Primary Examiner—Samuel A. Turner

(57) ABSTRACT

A tomographic interferometer device in which a spectral light source lights an object to create an object beam originating from that object. A stepped optical block is also exposed to the source to create a plurality of individual reference beams having different path lengths. The object beam and reference beams are made to interfere and the resulting light is sent to an array of side by side photodetectors. A plurality of lenses steer the light generated by the interference of each of the individual reference beams with the object beam to different photodetector cells of the array for generating a tomographic image of the object

23 Claims, 10 Drawing Sheets

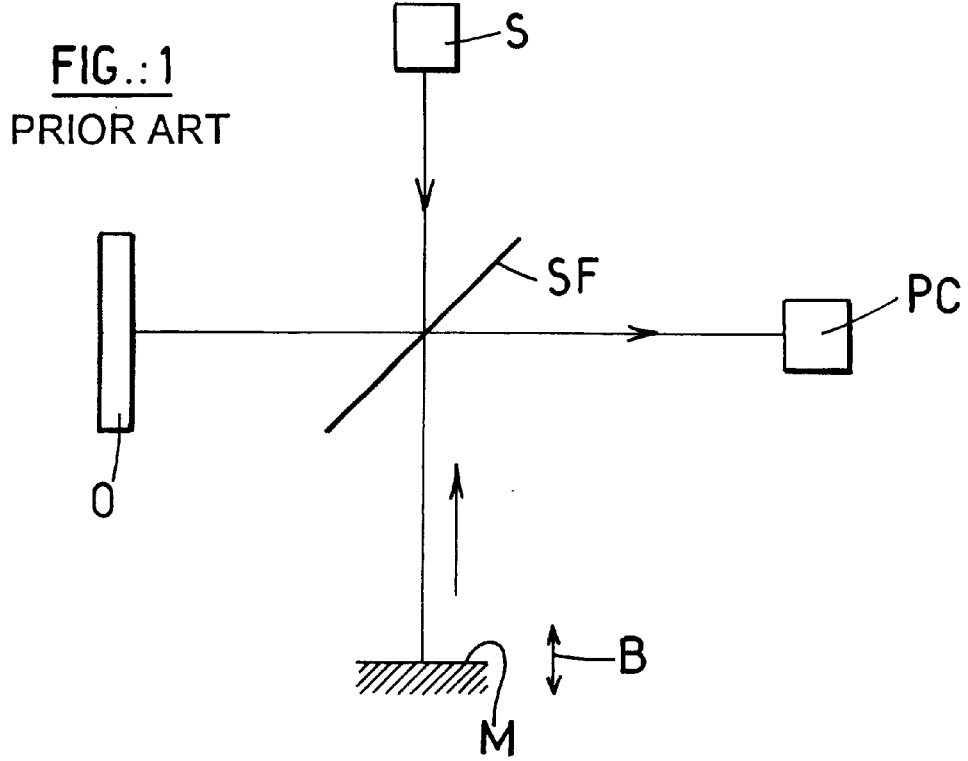
FIG.: 1
PRIOR ART
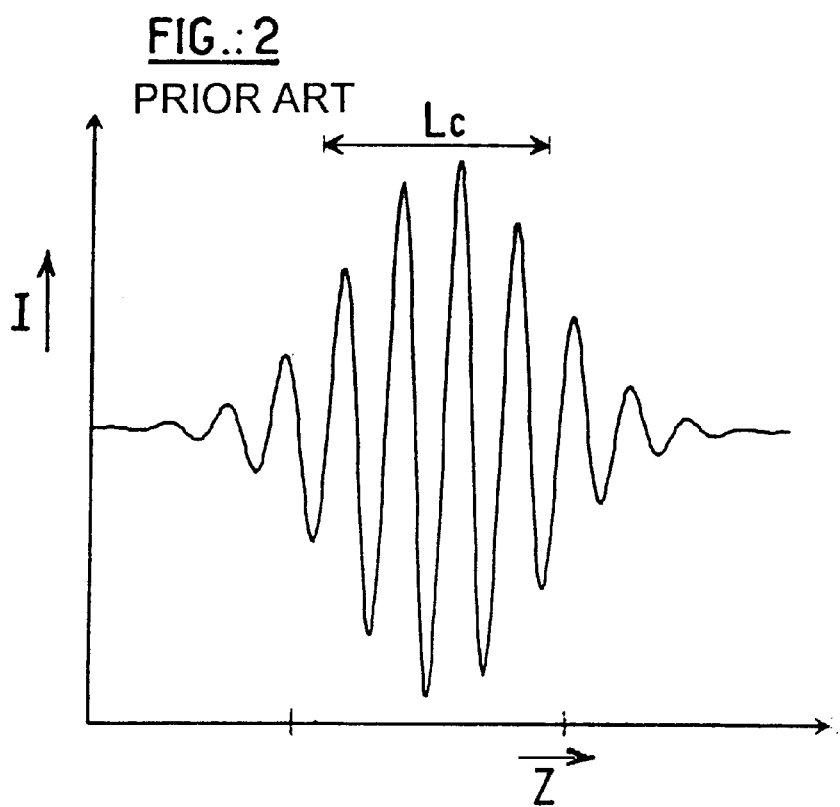
FIG.: 2
PRIOR ART

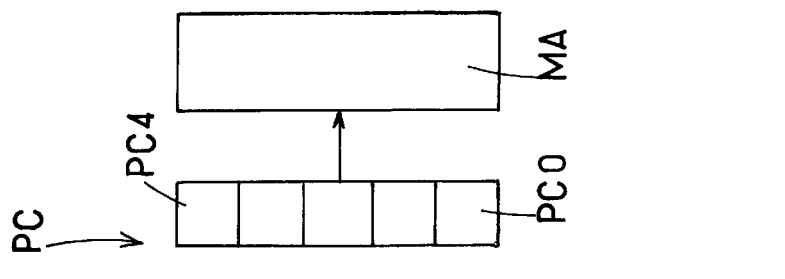
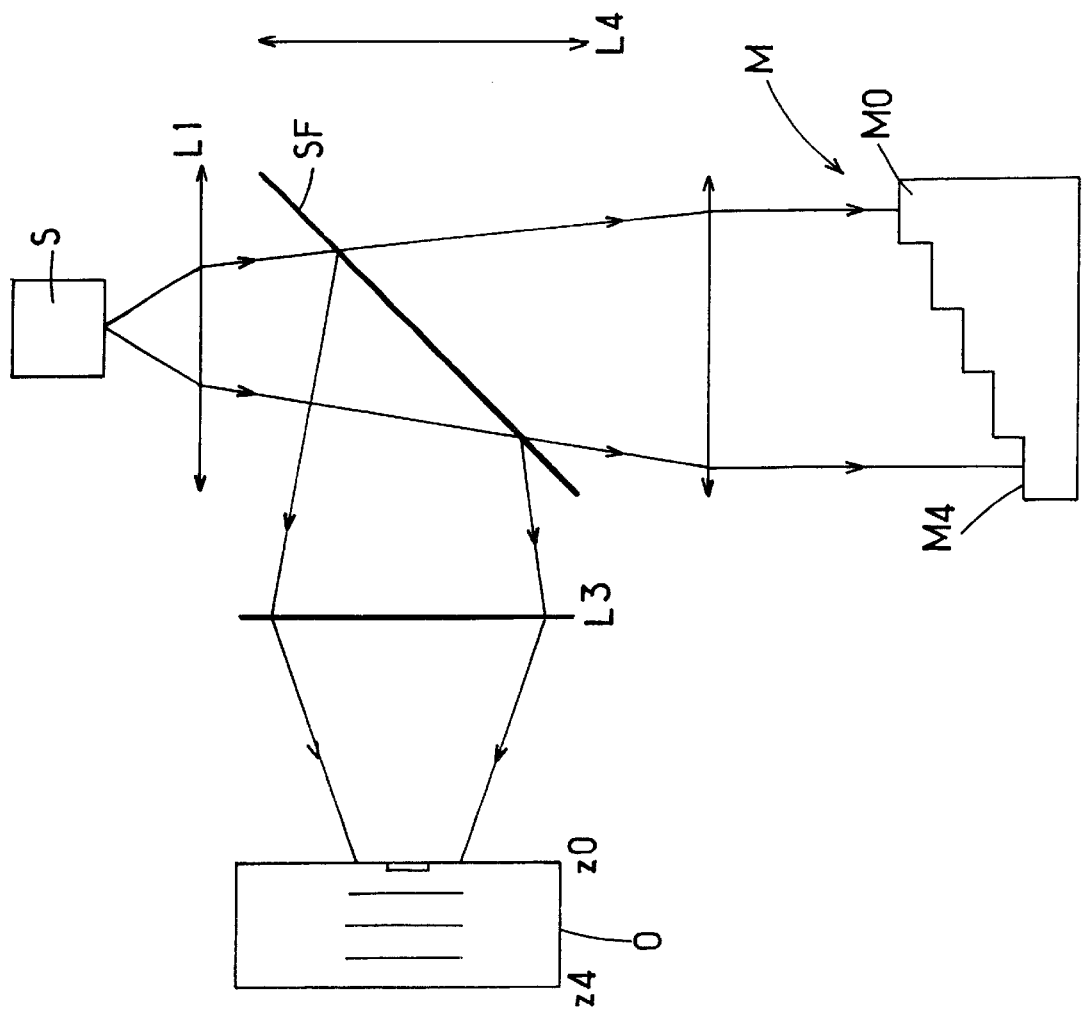
FIG.:3B

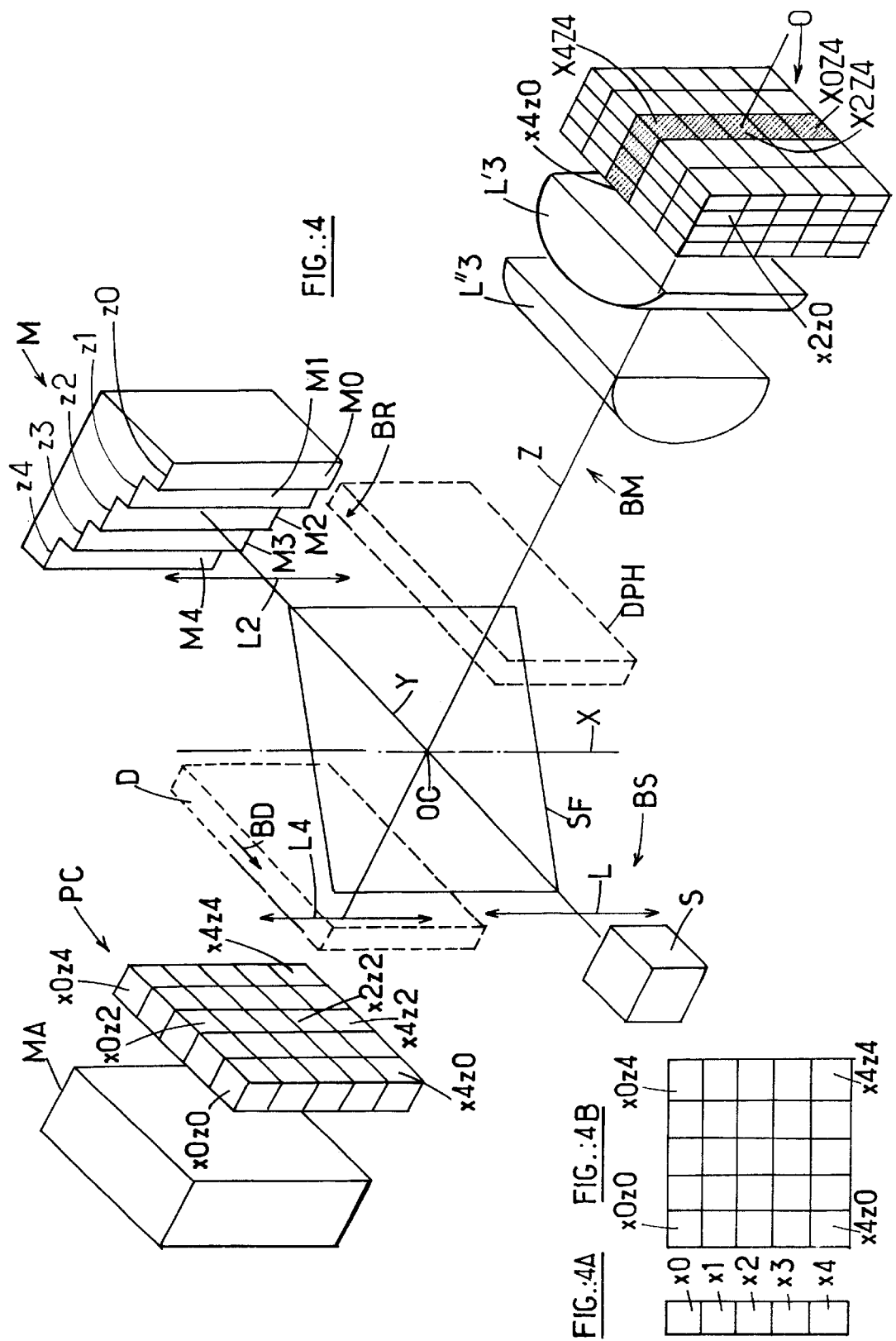

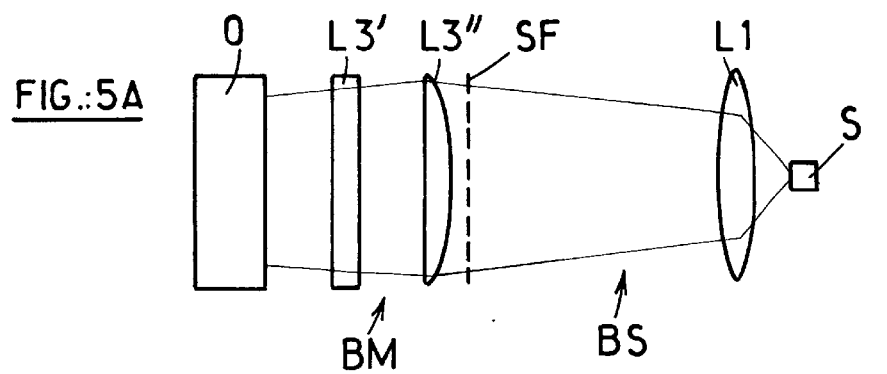
FIG.:5A
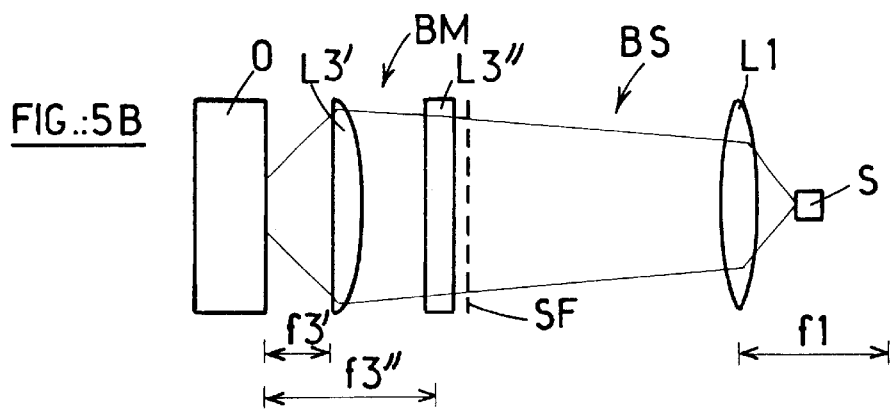
FIG.:5B
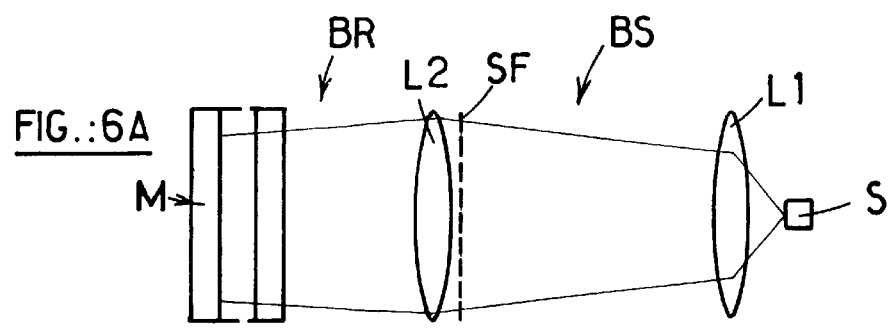
FIG.:6A
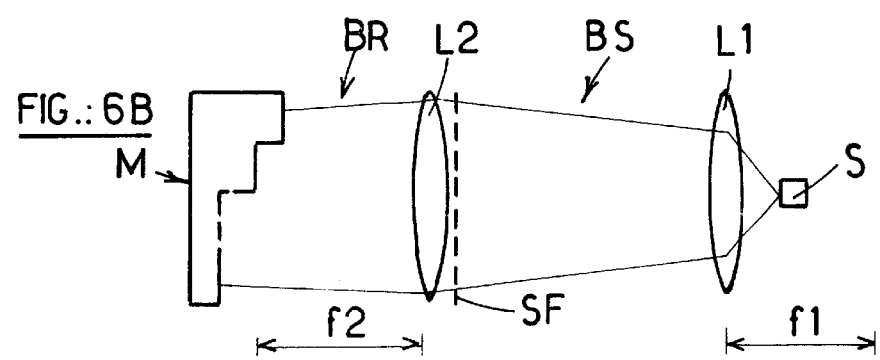
FIG.:6B

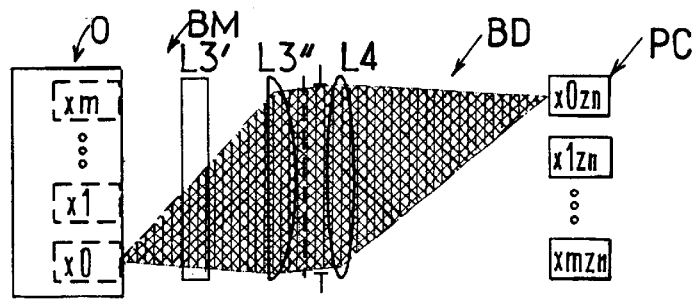
FIG.:7A
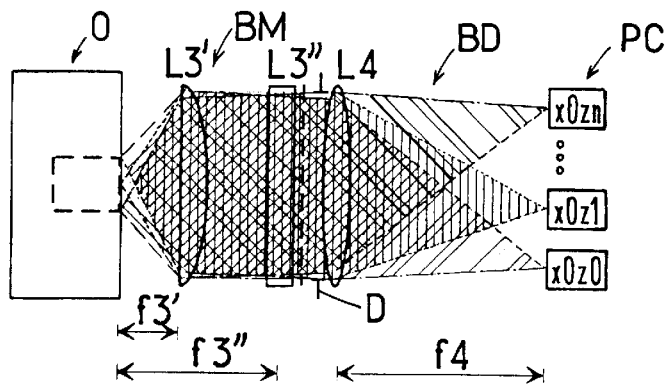
FIG.:7B
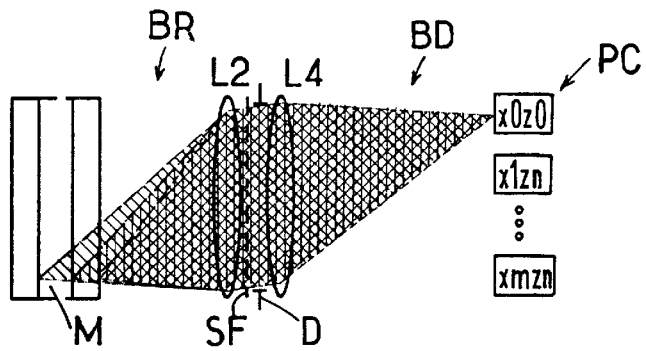
FIG.:8A
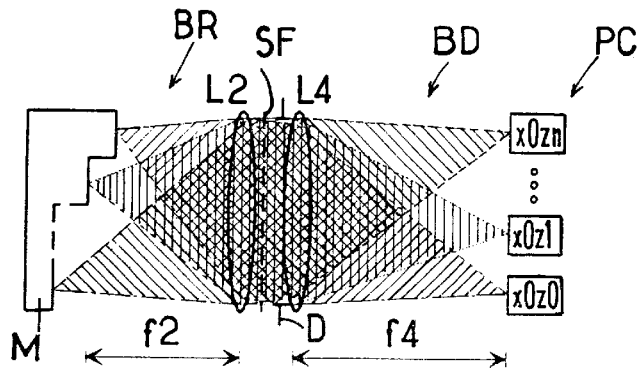
FIG.:8B

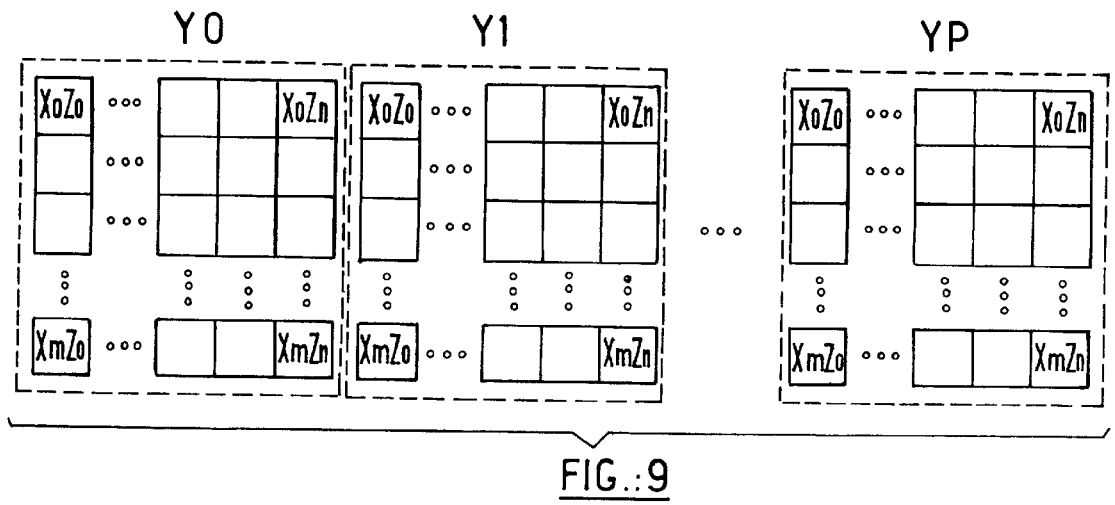
FIG.:9
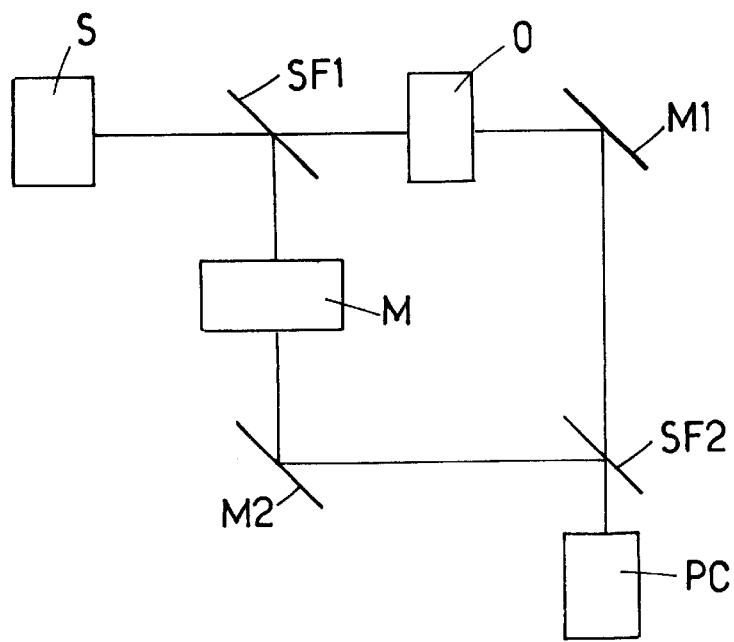
FIG.:11

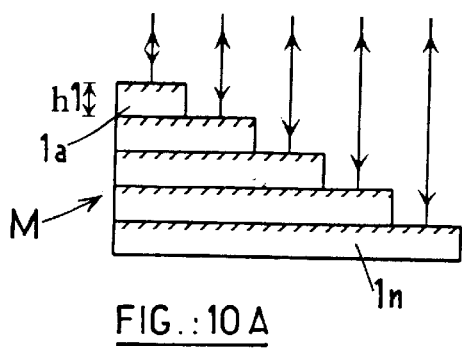
FIG.: 10 A
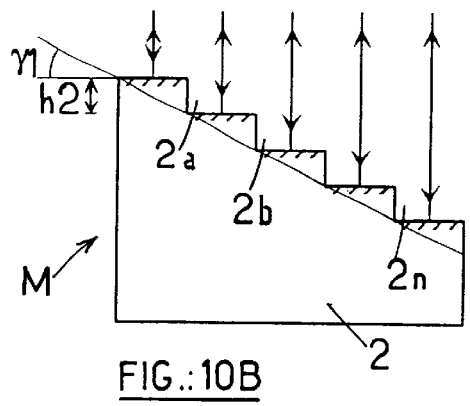
FIG.: 10 B
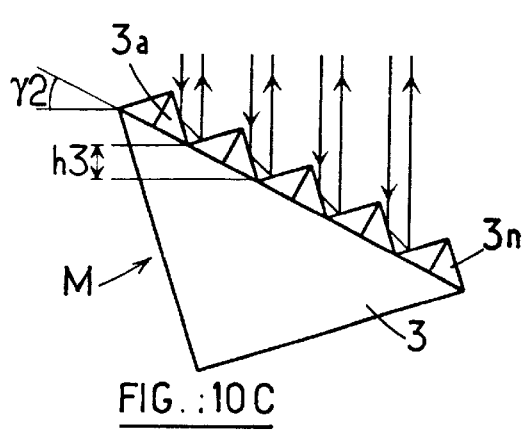
FIG.: 10 C
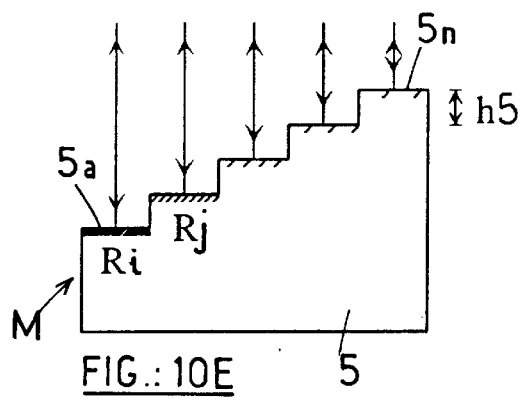
FIG.: 10 E
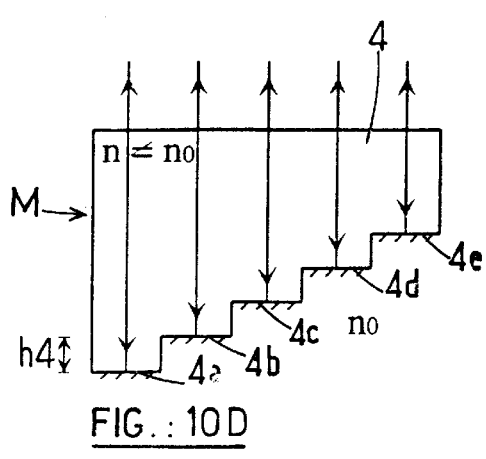
FIG.: 10 D
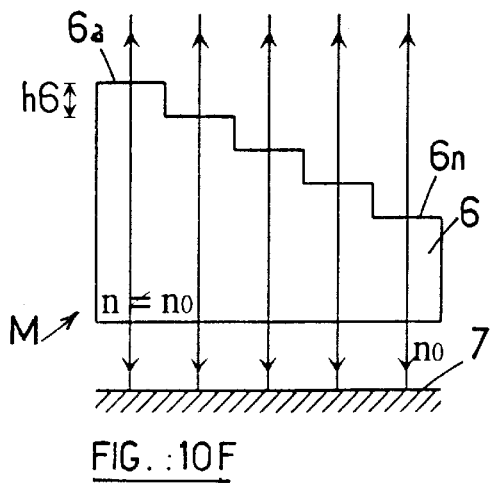
FIG.: 10 F

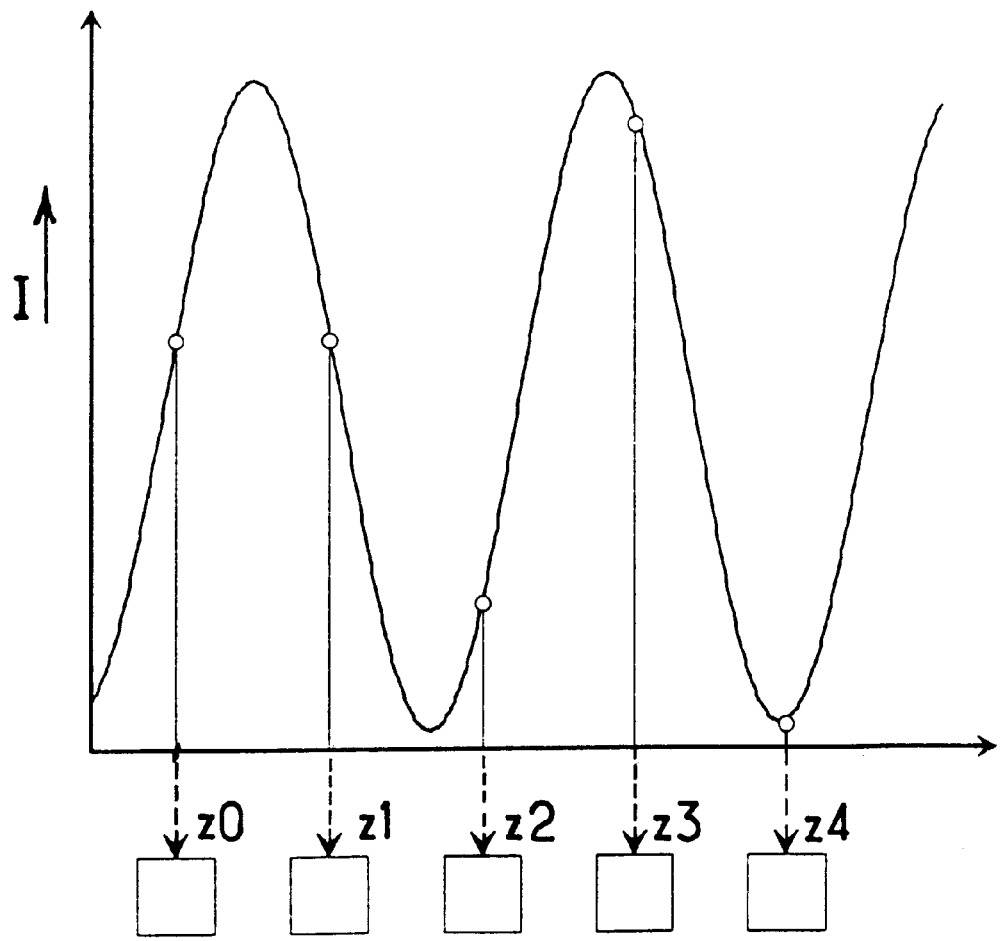
FIG.:12

INTERFEROMETRIC DEVICE FOR RECORDING THE DEPTH OPTICAL REFLECTION AND/OR TRANSMISSION CHARACTERISTICS OF AN OBJECT

BACKGROUND OF THE INVENTION

1. Field of the Invention

The present invention relates to the acquisition of images by optical tomography, whereby it is possible to obtain images formed by light ray intensities originating from an object to be studied, these intensities being a function of the depth in that object. These optical intensities can be obtained either by the reflection of rays on or in the object, or by the transmission of light through said object.

More particularly, the invention concerns the area of optical low-coherence interferometry and applies the principle of the Michelson interferometer.

FIG. 1 in the appended drawings represents such an interferometer. It includes a light source S with a broad spectral bandwidth which consequently has a low coherence length. The beam from this source is steered to a beam splitter SF which splits the beam from the source into a beam lighting an object O to be studied and a beam striking a reference mirror M.

In this figure, the beam striking the object O and the beam striking the mirror M are respectively reflected and steered through the beam splitter SF to be recombined and illuminate a photodetector PC. These reflected beams interfere with each other constructively and destructively, forming an interference fringe only if the difference of the optical distances covered is less than the coherence length of the source.

This interferometric device can therefore be used to obtain an indication, for example, as to the nature of the surface of the object. However, in the form that has just been described, this interferometer cannot be used to obtain tomographic information on the object, in other words, information obtained by reflection from several points inside the object, located by depth.

2. Description of the Prior Art

To obtain such depth information, depth scanning is already an accepted practice (see, for example, the paper by E. A. Swanson et al. in OPTICS LETTERS/Vol. 18, No. 21/Nov. 1, 1993). In this case, the interferometer is implemented using optical fibers and couplers, which does not fundamentally affect the measurement principle. However, to obtain information from different depths of the object, successive measurements are taken, each time changing the position of the reference mirror to modify the length of the optical path in the arm of the device containing said mirror (hereinafter called the reference arm). In FIG. 1, this movement is symbolized by arrow B.

The result of this is an interference graph as shown in FIG. 2 when the object O corresponds to an interface in which the light intensity I striking the photodetector PC is given as ordinates and the longitudinal position of the reference mirror M is given as abscissae (by convention, known as the Z-axis position which also reflects the depth position of the point of the object having given rise to the interference fringe concerned). It should be noted that the resolution of the measurement depends on the coherence length of the source S indicated by arrow Lc.

Such a scanning-based measurement process involving several measurements spaced out over time presents certain disadvantages, because, in addition to the fact that the measurement is necessarily fairly lengthy, it is seriously disrupted if the object is subject to movements. This may be the case, for example, in the medical domain, which has emerged as a particularly promising application, and in particular, when measurements are made on certain parts of the eye, such as the cornea or the retina. Furthermore, to move the mirror, it is necessary to use a mechanical movement element, which can result in vibrations and, possibly, a drop in performance over time.

Another disadvantage of this process is that the measurement applies only to points that are aligned with each other along an axis extending depthwise and defining the direction of the light beam reflected by the object (depth reflection profile).

Thus, to obtain the image of a slice taken depthwise through the object, various series of measurements must be performed successively as described above, that can be qualified as one-dimensional but are offset laterally from each other, to obtain groups of intensity values that must then be processed to convert these series of one-dimensional measurements into a two-dimensional result representative of the profile of a slice of the object. Clearly, this procedure exacerbates the disadvantages of the one-dimensional measurement in terms of measurement time and susceptibility to movements of the object.

The object of the invention is to provide a measurement device of the type briefly described above, which can be used to obtain instantaneously the entire result of the measurement, applied to a depth alignment of points, on a depth slice through the object, even a three-dimensional portion of the object.

SUMMARY OF THE INVENTION

The object of the invention is therefore an interferometric device for recording the depth optical reflection and/or transmission characteristics of an object by interferometry, comprising:

a light source emitting over a predetermined spectral bandwidth either side of a nominal wavelength and lighting said object to create an object beam reflecting from that object, reference means also exposed to said source to create a reference beam, means for making said object beam and reference beam interfere; and photodetector means arranged to receive the light due to the interference of said object beam and reference beam, and analysis means (MA) for analyzing the signals supplied by said photodetector means, wherein said reference means are arranged to split said reference beam into a plurality of individual reference beams, each having a different path length, wherein said photodetector means comprise a plurality of photodetector cells, and which also comprises optical recombination means to steer to each of said photodetector cells the light resulting from the interference of one of said individual reference beams and said object beam.

The result of these characteristics is that, in a one-dimensional measurement, the photodetectors all instantaneously supply all the intensity information of the interference fringes originating from different depths of the object, in other words, by electronically analyzing the output signals from the photodetectors, it becomes possible to reconstruct a graph such as the one in FIG. 2, without in any way moving the reference means.

Other characteristics and advantages of the invention will become apparent in the course of the description that follows, which is given only by way of example and with reference to the appended drawings.

BRIEF DESCRIPTION OF THE DRAWINGS

FIG. 1, already described, is a schematic representation of a conventional Michelson interferometer which can be used for optical tomography.

FIG. 2, also already described, shows a graph illustrating the operation of the conventional interferometer in FIG. 1.

FIG. 3B is a diagram similar to that of FIG. 3A, but showing the illumination of the object O and the reference means M by the source S.

FIG. 4 is a perspective drawing of a tomographic interferometer according to the invention which can be used to perform two-dimensional measurements to obtain optical information on a "slice" of the object.

FIGS. 4A and 4B schematically show two possible embodiments of the light source.

FIGS. 5A and 5B are schematic views, respectively an elevation view and a plan view of FIG. 4 and according to an aligned representation of the axes concerned, which serves simply to clarify the structure of the device, the measurement and source arms of the interferometric device according to the invention, to demonstrate the paths of the light rays in said arms.

FIGS. 6A and 6B are schematic views similar to those in FIGS. 5A and 5 showing the reference arm and the source arm aligned.

FIGS. 7A and 7B are views similar to those above and representing the measurement arm and the detection arm aligned.

FIGS. 8A and 8B are views similar to those above, but showing the reference arm aligned on the detection arm.

FIG. 9 is a schematic representation of a typical arrangement of the photodetector means used to implement a three-dimensional interferometric device according to the invention.

FIGS. 10A to 10F show several possible variants of the reference means of the interferometric device according to the invention.

FIG. 11 shows a schematic diagram of an interferometric device working in transmission FIG. 12 is a graph of intensity I as a function of the depth in an object, to illustrate a particular analysis method that can be used to implement the interferometric device according to the invention.

DETAILED DESCRIPTION OF THE REFERRED EMBODIMENTS

Figure 3:
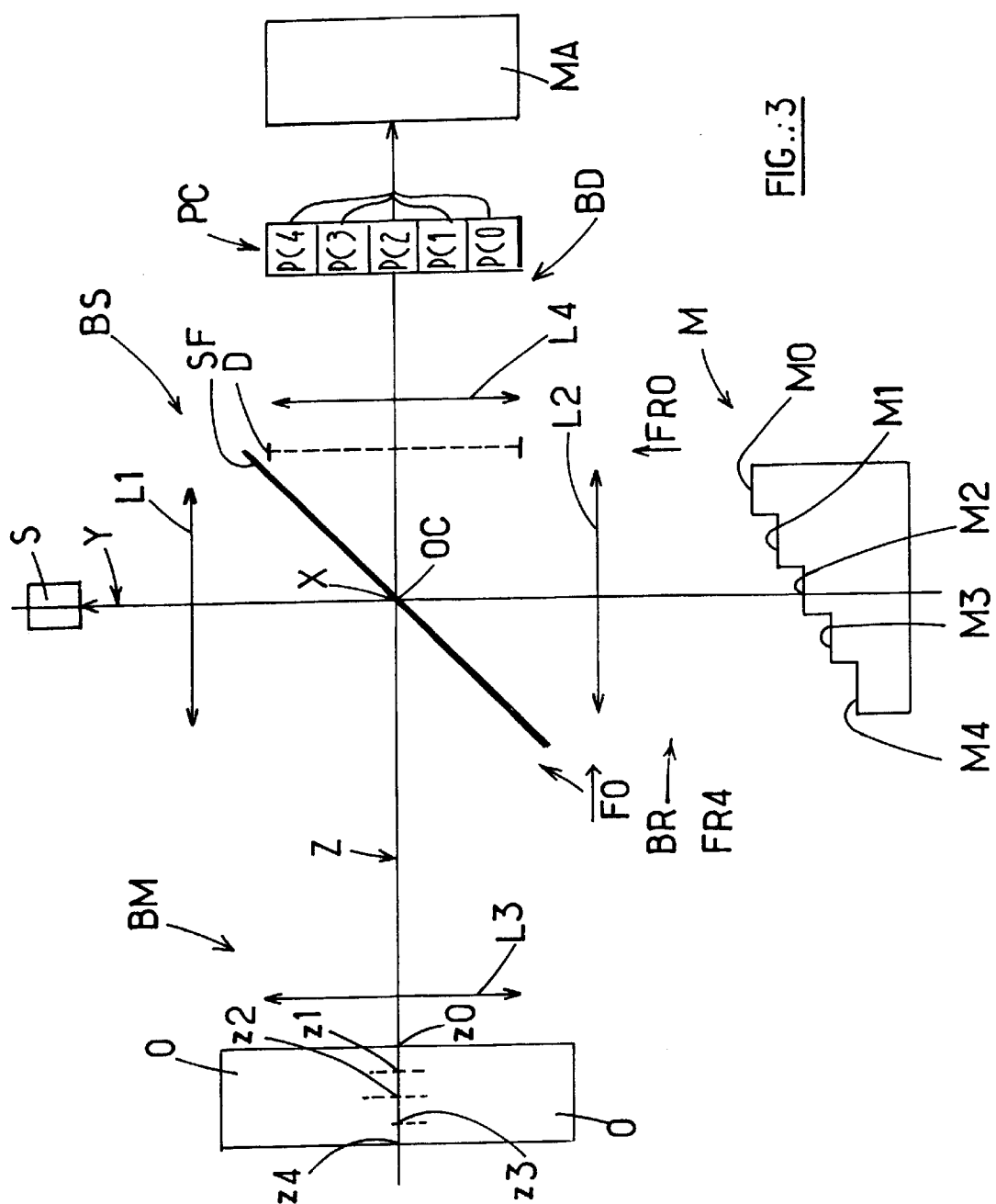
FIG. 3 is a diagram showing the components that form a one-dimensional tomographic interferometer according to the invention.
Figure 3A:
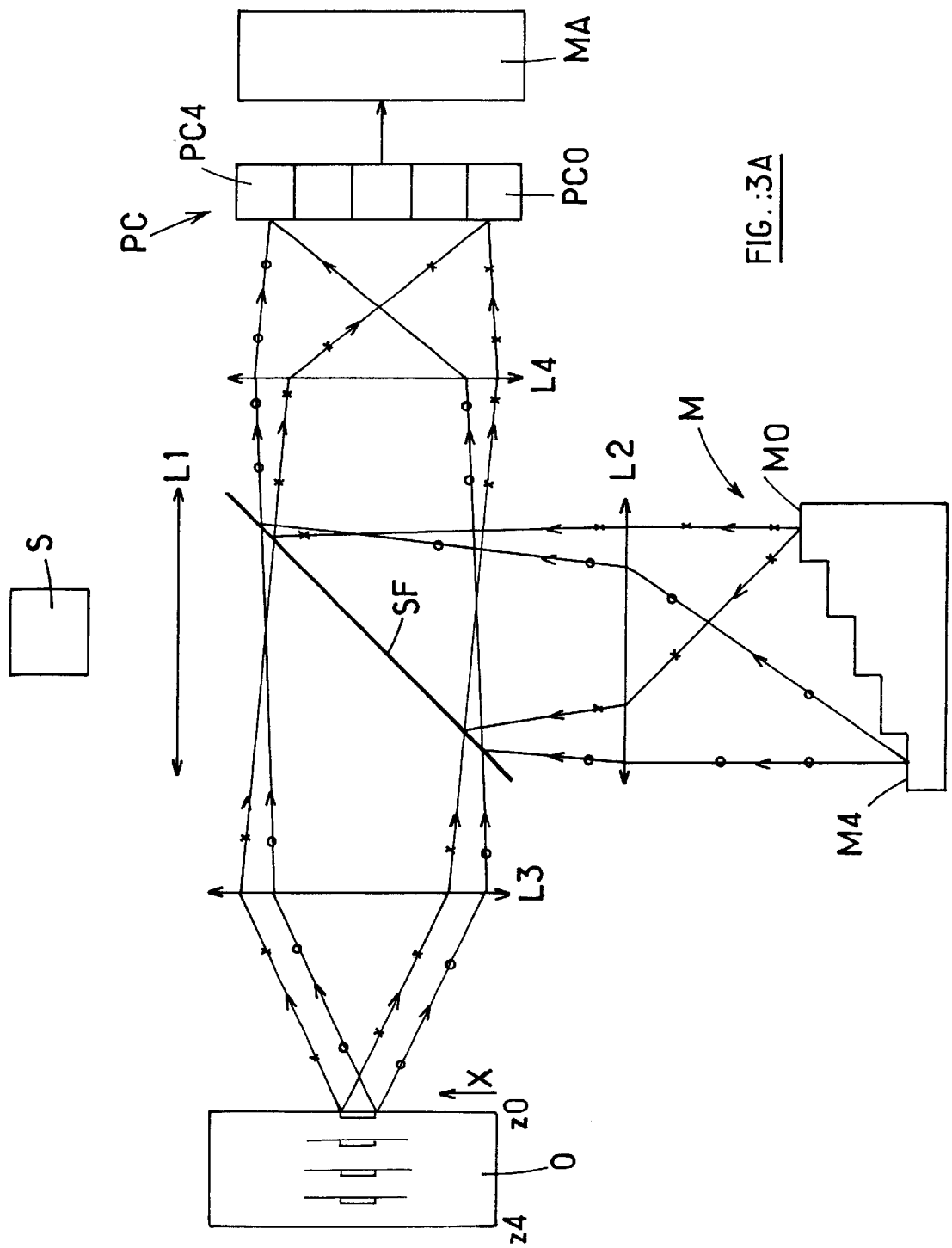
FIG. 3A is a diagram showing the paths of the beams reflected by the object O and the reference means M in the interferometer in FIG. 3.

The description now refers to FIGS. 3, 3A and 3B, which represent a typical embodiment of an interferometric system according to the invention which can be used to record the depth reflection characteristics of an object O. In this example, the system is said to be "one-dimensional" because it can record measurement data only on a single axis Z which is assumed to pass through the object. In other words, in the example, the measurement data are taken at five points z0 to z4, point z0 being located, for example, at the front, and point z4 at the back of the object. Intermediate points z1, z2 and z3 can be representative of other places in the object where the reflection characteristics can translate its structural properties, for example. The readings from the measurements taken can then inform the observer as to the typical characteristics of the object.

The number of measurement points is by way of indication only, since the system can simultaneously record many more points at a time, for example points z0 to zn. The number five has therefore been chosen solely to simplify the drawings.

The interferometric device also comprises a light source S with a wide bandwidth and therefore low coherence length. By way of example, this source S comprises a superluminescent diode emitting on a wavelength of 850 nm with a bandwidth of 20 nm. The source can also include an 850 nm single-mode optical fiber (not shown), to ensure that the beam is sent in a single spatial mode.

The device also comprises a beam splitter SF, reference means M and photodetector means PC. These components are arranged in the same way as in FIG. 1 in accordance with the Michelson interferometry layout.

To simplify the description, the following terms are used
measurement arm BM, to mean the part of the device extending between the splitter SF and the object O:
reference arm BR, to mean the part located between the splitter SF and the reference means M;
source arm BS, to mean the part located between the splitter SF and the source S; and
detection arm BD, to mean the part located between the splitter SF and the photodetector means PC.

Arms BM and BD are aligned on the Z axis and arms BR and BS are aligned on a Y axis perpendicular to the Z axis and located in the same plane (which is assumed to be the plane of the drawing in FIG. 3). The Y and Z axes cross at the center point OC of the system An X axis is defined perpendicular to this plane.

According to the invention, the reference means M comprise a mirror presenting a plurality of individual mirrors M0 to M4, in this case five, and arranged on a single optical block featuring steps, whose active faces are arranged perpendicular to the Y axis and parallel to the X axis. As a general rule, reference means M comprise as many steps as there are measurement points required along the Z axis in the object O. The steps therefore define in the reference arm BR so many individual reference beams FR0 to FR4, all with different path lengths.

Also according to the invention, the photodetector means PC comprise a row of photodetector cells PC0 to PC4, in this case also numbering five, the number depending on the number of measurement points that are to be defined through the depth of the object O. It will be noted that the photodetector cells PC0 to PC4 are arranged side by side in their row parallel to the Y axis.

Elsewhere, and still according to the invention, the interferometer system comprises a set of lenses L1 to L4 (see in particular FIGS. 3A and 3B).

The first of these lenses L1 is a collimator and incorporated in source arm BS. It is placed in front of the source S and its purpose is to form an image of that source on the face of object O through lens L3 and on all steps M0 to M4 of reference means M through lens L2. The distance of lens L1 relative to the source S is preferably less than its focal distance to defocus the light spot on the object O and on the reference means M, in order to light the object O and all the reference means M.

Furthermore, lenses L2, L3 and L4, together with splitter SF, form optical recombination means. They are determined such that each photodetector cell PC0 to PC4 at the same time receives the light from a position (xi, yi) of the object O via the object beam FO, and that, furthermore, each photodetector cell PC0 to PC4 receives the light only from a single step M0 to M4 of the reference means M. In other words, the pair of lenses L2 and L4, respectively located in the reference arm BR and in the detection arm BD, projects an image of the reference means M onto the photodetector cells PC0 to PC4, at the rate of one step for each photodetector cell. For its part, the pair of lenses L3 and L4, respectively located in measurement arm BM and detection arm BD, projects an image of the object O onto the set of photodetectors PC0 to PC4. The focal lengths of lenses L3 and L4 will preferably be chosen such that f3<<f4, which will make it possible to obtain a favorable resolution in the direction of the X axis and the Y axis. Individual reference beams FR0 to FR4 and beam FO projected in this way interfere with each other to form an interference image which is received by the photodetectors (PC0 to PC4).

How to obtain this result will be obvious to experts who will be able to determine according to these rules the characteristics of the lenses to be used. To be more specific, lenses L1 to L4 can be spherical lenses, preferably achromatic.

It should be noted that according to one variant, the lenses could be replaced by appropriate light waveguides.

The interferometric system according to the invention that has just been described can be used, with a single row of photodetector cells, to obtain in a single instantaneous measurement, a datum for each point in depth through the object (point z0 to z4), at the rate of one datum for each photodetector cell. The signals received on photodetector cells P0 to P4 can be analyzed by processing them in the analysis device MA, according to the results that are ultimately required, with some methods for processing them being described below.

FIG. 4 is a sketch of a second possible embodiment of the invention, in which the interferometric system is two-dimensional. In the context of the invention, this means that it can supply optical data relative not just to points of the object located by depth (along the z axis), but also according to another direction which, in the example shown, is the direction X. In other words, it becomes possible to record data on a "slice" of the object indicated by oblique lines in FIG. 4 to obtain optical data according to a profile.

The measurement system of FIG. 4 differs mainly from that of FIG. 3 on three points (bearing in mind once again that, in the interests of simplicity, the number of points recorded has been limited to five in depth and five in direction X):

the reference means M are extended in the direction of the X axis, to a height such that the individual reference beams from steps M0 to M4 can be directed to the five X axis zones of photodetector means PC;

the photodetector means PC comprise an array of photodetector cells extending in directions X and Y (in this case, of course, with five elements for each direction);

the recombination means comprise, instead of the lens L3 of FIG. 3, two separate lenses L3' and L3", cylindrical in shape and with axes that are respectively parallel to direction X and to direction Y. The convex faces of these lenses L3' and L3" are turned toward the splitter SF. As in the case of FIG. 3, focal lengths L3' and L4 will preferably be chosen such that f3'<<f4, which will mean that a favorable resolution can be obtained in direction Y.

FIGS. 5A to 8B provide an analysis according to an aligned representation of the arms of the interferometric device, respectively seen in elevation view and in plan view, according to FIG. 4. The figures show the focal lengths of lenses L1 to L4 and their general shapes, and the general routing of the beams. Regarding FIGS. 7A to 8B, only a few of the beams are shown to keep the figures uncluttered. These figures also show that a diaphragm D can be placed in the detection arm BD at the splitter SF end. The aperture of this diaphragm is chosen such that the light spot that arrives at the surface of a photodetector remains within a single diffraction cone. This condition ensures optimal detection of the interference fringes. Such a diaphragm can also be used in the interferometer of FIG. 3, as shown.

FIGS. 5A to 8B also show the identifiers of the object points and the corresponding photodetectors, with identification of steps z0 to z4 of reference means M.

It will also be noted that the number of measurement points depthwise can be very much greater than five (from z0 to zn), as can the number of points heightwise according to direction X (from x0 to xm).

FIG. 9 is a schematic representation of a typical arrangement of photodetector means PC turned toward the splitter SF, according to a particularly advantageous embodiment of the invention. In practice, according to a particularly advantageous characteristic of the invention, it is possible to extend the two-dimensional interferometric device to a three-dimensional device through two extremely simple additions. Firstly, instead of a single array of x0z0 to xmzn photodetector cells, in this case, a plurality of arrays identified by references y0 to yp are provided, and placed side by side along the Y axis of the device. Secondly, a plurality of reference means is provided, placed side by side according to the z axis of the device. In these conditions, each of the arrays of photodetector cells will receive the image of a reflection plane of the object, the planes being arranged in parallel, one behind the other along the Z axis. In this way, optical data within a volume of the object O can be obtained on photodetector means PC, instantaneously without the need for any mechanical adjustment staged over time. The measurement time will be determined solely by the speed of operation of the electronic analysis means MA. However, these may, with no particular difficulty, incorporate memory means to store the data supplied by photodetector means PC before any electronic analysis is undertaken. It is therefore of little importance that the object is subject to movement, since the acquisition time of the photodetector means and storage are virtually instantaneous. This applies equally for the one-dimensional and two-dimensional embodiments.

FIG. 10A shows a first possible variant of the reference means M, in which they are formed by a plurality of mirrors 1a to 1n overlaid and staggered, with depth increment Δz between two measurable adjacent points being determined by the thickness h1 of individual mirrors 1a to 1n.

FIG. 10B shows a second variant in which the reference means M comprise a blazed grating 2, in which the angle γ1 defines the blaze angle and in which the dimension h2 of notches 2a to 2n defines the increment Δz which is the optical depth distance between two measurable adjacent points in the object O.

According to FIG. 10C, the reference means comprise an array 3 of retroreflectors, or "corner cubes", 3a to 3n, in the form of pyramids with a rectangular base. The angle γ2 defines the inclination of the plane of the bases of the corner cubes relative to the direction perpendicular to the individual beams. The dimension h3 designates the increment Δz.

FIG. 10D shows another form in which the reference means can be implemented. In this case, a block 4 in a transparent medium is cut in "staircase" shape on its rear face, and reflecting deposits facing the opposite side of block 4 are applied to steps 4a to 4n. These steps shape the light from source S into so many individual reference beams. Here, the increment is obtained by applying the relation Δz=h4|n−n$_o$|, in which h4 is the height of a step, n is the refraction index of the medium of block 4 and no is the refraction index of the medium in which the interferometric device is located. The advantage of this variant is that, by choosing a material with a refraction index n close to that of the object O, the loss in resolution due to the dispersion of the light in the reference and measurement arms of the interferometer can be reduced.

The variant in FIG. 10E takes the same form as that in FIG. 10B. It comprises a block 5 in which the steps are coated with reflecting deposits 5a to 5n. The reflection coefficients Ra to Rn of these deposits are chosen according to the local nature of the points depthwise in the object to be examined. A typical application of such reference means is found, for example, for depth examination of the eye, in which the retina and the cornea have very dissimilar reflection coefficients, differences that these reference means can offset by choosing defined reflection coefficients for the deposits.

FIG. 10F shows a variant of the reference means that work by transparency. In this case, a block 6 in a transparent medium is cut in a staircase shape to form treads 6a to 6n. This block is placed in alignment with source S and a reflecting flat surface 7 is arranged behind its opposite face. In this case, the depth increment Δz is equal to that of the variant in FIG. 10D.

Block 6 can also be used in an embodiment of the interferometric device according to the invention in which the reference means M and the object are traversed by the light beams. A variant of such a device is shown in FIG. 11, which requires no further comments if only because the results obtained are similar to those described with reference to FIGS. 3, 4 and 9, respectively. The figure shows Mach-Zehnder interferometers which are well known to the experts. It includes two beam splitters SF1 and SF2 and two return mirrors M1 and M2.

Increment Δz corresponding to an interference fringe is linked to the wavelength of the source and equals λ/2.

The useful data in the signal perceived by the photodetector cells is the maximum of the intensity of an interference fringe. FIG. 12 illustrates a straight analysis of the signals obtained, which can be executed by analysis means MA. It is important to note that, in the measurement, such a maximum may not coincide with a photodetector cell of the array. However, by having a number of detecting cells for each fringe greater than 1, interpolation can be provided by calculation, typically over three points. This makes it possible to calculate the amplitude of a given interference fringe and therefore know the maximum optical intensity reflected by the object O at a depth for which no measurement data has been recorded. This method has the benefit of simplicity, but requires many photodetector cells.

A differential method enables fewer photodetectors to be used. To implement this method, a phase shifter or a phase modulator must be provided either in the measurement arm BM, or in the reference arm BR. This phase shifter or phase modulator may be a liquid crystal cell, typically controlled by an electrical voltage. It is depicted in broken lines at DPH in FIG. 4, but it can also be provided in the interferometer of FIG. 3.

It is important at this stage to proceed in two stages. An image is acquired on the array of photodetector cells PC. Then, a phase shift is obtained by applying the electrical voltage to the phase shifter or phase modulator DPH. A new image is acquired on the array of photodetectors PC. Then, the analysis means MA perform a selective subtraction of the signals obtained from the two successive images.

The result is that the analysis means supply a non-zero signal only at positions Z where there is interference. This method makes it possible to see the interference fringes, but not necessarily to obtain the maximum intensity of a fringe.

To be sure of observing at least one interference fringe, the difference between the optical length during the first measurement and that resulting from the phase shift must be chosen such that they are not a multiple of 2π. This method makes it possible to use only two or three sensors for each group of interference fringes, bearing in mind that the length (spatial spread) of a group of fringes is determined by the coherence length Lc of the source S. However, it requires two successive measurements, admittedly very close in time.

The amplitude of an interference fringe can also be detected by time-domain sampling. Also, the phase shifter or phase modulator DPH is provided either in the reference arm BR or in the measurement arm BM. For each detector, three light intensities $I_1$, $I_2$ and $I_3$ are recorded, corresponding to three different successive phase shifts, typically 0°, 120° and 240°. The phase value is taken relative to the average wavelength of the source S. The intensity reaching a given photodetector cell is given by $I_i(\phi)=I_{avg}+I_0\cos(\phi+\phi_0)$, in which φ0 is a constant that depends on all the phase shifts introduced by the elements of the device, $I_{avg}=(\frac{1}{3})\Sigma_i(I_i)$ is the arithmetic mean of the intensities, and $I_0$ is the amplitude of the interference fringe. This last is given by $I_0=(\Sigma_i(I_i-I_{avg})^2)^{1/2}$.

The three analysis methods that have been described above have the advantage of permitting the use of standard photodetector arrays, such as a CCD camera, APS (Active Pixel Sensor), etc.

The phase shifter or phase modulator DPH can be used to modulate the phase of the light either in the measurement arm or in the reference arm periodically, sinusoidally for example. Together with the photodetectors used to apply synchronization with the modulation frequency (lock-in technique), a heterodyne detection system can be implemented, to reduce the level of noise to the shot noise level, and therefore to significantly improve the performance of the device. In this case, the analysis means can be advantageously implemented according to the method described in the paper by Swanson et al., published in "Optics Letters", Jan. 15, 1992, Vol 17, No. 2.

The source S may be unique as described hitherto. However, it is also possible to use a line of sources, even an array. The result is that more light energy becomes available for each photodetector cell, which means that a better signal/noise ratio can he obtained.

In the case of a column of m sources (illustrated in FIG. 4A, if m=5), each beam illuminates a position along the X axis of the sample and lights all the individual mirrors z0 to zn of the reference means. Each beam from the measurement arm BM is recombined with its series of beams from the reference arm BR.

If an array of mxn sources is provided (illustrated, on the rear face, in FIG. 4B, if m and n=5), each line of n source beams illuminates a position along the X axis of the object O and lights all the positions z0 to zn (along the Z axis) of the reference means, at the rate of one individual source per position. Each beam from the measurement arm BM is recombined with its associated reference beam.

Appropriate light sources are edge-emitting diodes, laser diodes, stacked laser diode arrays or vertical cavity surface-emitting laser (VCSEL) diode arrays or diodes. Light emitting diodes or other sources emitting noncoherent light (tungsten filament) can also be used with circular or rectangular diaphragms.

There is claimed:

1. An interferometric device for recording the depth optical reflection or transmission characteristics of an object by interferometry, comprising:

a light source emitting over a predetermined spectral bandwidth on either side of a nominal wavelength and lighting said object to create an object bean originating from that object;

reference means also exposed to said source for creating a plurality of individual reference light beams, each having a different path length;

means for making said object beam and reference beams interfere;

a photodetector array comprising a plurality of photodetector cells arranged side by side to receive the light due to the interference of said object beam and said reference beams;

a plurality of lenses for steering to each of said photodetector cells the light resulting from the interference of one of said individual reference light beams and said object beam; and analysis means for analyzing the signals supplied by said photodetector array.

2. The interferometric device claimed in claim 1, wherein said reference means include an optical block with steps coated with a reflecting deposit situated with said source.

3. The interferometric device claimed in claim 2, wherein said optical block comprises a plurality of overlaid reflecting blades, the edges of which are staggered to form said steps.

4. The interferometric device claimed in claim 2, wherein the block comprises steps cut out of its bulk.

5. The interferometric device claimed in claim 4, wherein the steps are disposed on the face of the block turned toward said source.

6. The interferometric device claimed in claim 4, wherein the block is transparent and the steps are provided on the face of the block located on the side opposite that turned toward said source.

7. The interferometric device claimed in claim 2, wherein the reflection coefficient of the reflecting deposit varies from one step to the next.

8. The interferometric device claimed in claim 1, wherein said reference means includes an optical block in which the face turned toward said source has pyramid-shaped protruberances.

9. The interferometric device claimed in claim 1, wherein said reference means includes:

a transparent optical block having steps on one face thereof, and a reflecting surface facing said source, said optical block being positioned between said source and said reflecting surface.

10. The interferometric device claimed in claim 1, wherein said photodetector array comprises a single row of side by side photodetector cells for performing a one-dimensional measurement for recording a set of measurement points aligned depthwise within the object.

11. The interferometric device claimed in claim 1, wherein said photodetector array is a two dimensional array for performing a two-dimensional measurement for recording a set of measurement points aligned both depthwise within the object and along an axis perpendicular to that alignment.

12. The device of claim 1, wherein said light source, reference means, means for making said object beam and reference beam interfere, and said photodetector array are fixed with respect to one another.

13. The interferometric device claimed in claim 1, wherein said plurality of lenses includes a first set of lenses in the light path between said photodetector array and said reference means, to project an image of said reference means onto the photodetector cells of said photodetector array, with one individual reference light beam for each photodetector cell, and which furthermore comprises a second set of lenses in the light path between said object and said photodetector array, to project an image of the object onto the photodetector cells, and wherein the lenses adjacent to said photodetector array are common to said first and second sets of lenses.

14. The interferometric device claimed in claim 13, wherein the lenses of the first and second sets of lenses are convergent and spherical.

15. The interferometric device claimed in claim 13 wherein the lenses of the first set are spherical and wherein the lenses of said second set adjacent to said object, includes two lenses, convergent and cylindrical in shape, the axes of which are perpendicular to each other.

16. The interferometric device claimed in claim 1, wherein said source, said reference means, said photodetector array and said object are arranged according to the Michelson interferometer having a beam splitter placed at the center thereof for generating the interference between said individual reference beams and said object beam.

17. The interferometric device claimed in claim 16, further including a diaphragm placed between said beam splitter on the side thereof turned toward said photodetector array.

18. The interferometric device claimed in claim 16, further including a phase shifter or phase modulator disposed on the side of the beam splitter turned toward said object, or toward said reference means.

19. The interferometric device claimed in claim 13, wherein said lenses of said second set of lenses have focal distances such that $f3<<f4$, in which $f3$ is the focal distance of the lens placed adjacent to the object and $f4$ is the focal distance of the lens placed adjacent to said photodetector array.

20. The interferometric device claimed in claim 1, wherein said source, said reference means, said photodetector array and said object are arranged as a Mach-Zehnder interferometer, and wherein said object and said reference means are traversed by the object beam and reference beams, respectively.

21. The interferometric device claimed in claim 1, wherein said source comprises an arrangement of several individual sources arranged in a single row or two dimensional array.

22. The device claimed in claim 18, wherein said phase shifter or phase modulator is used to enable heterodyne detection on the output signal from said photodetector means.

23. An interferometric device for recording the depth optical reflection or transmission characteristics of an object by interferometry, comprising a light source emitting over a predetermined spectral bandwidth on either side of a nominal wavelength and lighting said object to create an object beam originating from that object, a plurality of reference means arranged adjacent one another for being exposed to said source for creating a plurality of sets of individual reference light beams, each beam of a set having a different path length from the other beams of said set, means for making said object beam and said individual reference beams interfere;

a plurality of two dimensional photoconductor arrays arranged adjacent one another, each comprising a plurality of photodetector cells, a plurality of lenses for steering to each of said photodetector arrays the light resulting from the interference of a different one of said sets of individual reference light beams and said object beams, each of said photodetector cells receiving the light resulting from the interference of a different one of said individual reference light beams and said object beam, and analysis means for analyzing the signals supplied by said photodetector arrays.

* * * * *